(12) United States Patent
Polk, Sr. et al.

(10) Patent No.: US 9,188,364 B2
(45) Date of Patent: Nov. 17, 2015

(54) PARABOLIC SOLAR ENERGY COLLECTOR APPARATUS

(75) Inventors: Dale E. Polk, Sr., Titusville, FL (US);
Dale E. Polk, Jr., Titusville, FL (US)

(73) Assignee: D AND D MANUFACTURING

( * ) Notice: Subject to any disclaimer, the term of this patent is extended or adjusted under 35 U.S.C. 154(b) by 1420 days.

(21) Appl. No.: 12/639,305

(22) Filed: Dec. 16, 2009

(65) Prior Publication Data

US 2010/0147284 A1    Jun. 17, 2010

Related U.S. Application Data

(60) Provisional application No. 61/138,287, filed on Dec. 17, 2008.

(51) Int. Cl.
| | |
|---|---|
| F24J 2/10 | (2006.01) |
| F24J 2/07 | (2006.01) |
| F24J 2/14 | (2006.01) |
| F24J 2/52 | (2006.01) |
| F24J 2/54 | (2006.01) |
| F24J 2/00 | (2014.01) |
| F24J 2/46 | (2006.01) |

(52) U.S. Cl.
CPC .... F24J 2/07 (2013.01); F24J 2/14 (2013.01); F24J 2/5237 (2013.01); F24J 2/541 (2013.01); F24J 2002/0084 (2013.01); F24J 2002/4692 (2013.01); F24J 2002/5458 (2013.01); F24J 2002/5462 (2013.01); F24J 2002/5475 (2013.01); Y02E 10/41 (2013.01); Y02E 10/45 (2013.01); Y02E 10/47 (2013.01)

(58) Field of Classification Search
CPC ... F24J 2/5237; F24J 2/541; F24J 2002/4692; F24J 2002/5458; F24J 2002/5475; F24J 2/12; F24J 2002/0084

USPC ............... 126/576, 605, 624, 570–571, 600, 126/606–607, 680–681, 690–692, 694–696, 126/701–703; 52/173.3
See application file for complete search history.

(56) References Cited

U.S. PATENT DOCUMENTS

| | | | | |
|---|---|---|---|---|
| 257,560 | A * | 5/1882 | Deitzler ..................... | 126/694 |
| 1,047,554 | A * | 12/1912 | Nichols ..................... | 126/607 |
| 1,683,266 | A * | 9/1928 | Shipman ..................... | 126/683 |
| 3,938,497 | A * | 2/1976 | Andrassy ..................... | 126/682 |
| 3,959,056 | A * | 5/1976 | Caplan ..................... | 156/197 |
| 3,988,166 | A * | 10/1976 | Beam ..................... | 136/246 |
| 4,035,065 | A |  7/1977 | Fletcher et al. ............... | 350/310 |

(Continued)

FOREIGN PATENT DOCUMENTS

WO       WO 2006070425 A1 *   7/2006

*Primary Examiner* — Avinash Savani
*Assistant Examiner* — Vivek Shirsat
(74) *Attorney, Agent, or Firm* — Allen, Dyer, Doppelt, Milbrath & Gilchrist, P.A.

(57) ABSTRACT

A solar energy collector apparatus includes a solar collector panel having a parabolic shape, and a base comprising a pair of spaced apart support frames. Each support frame has a parabolic shape corresponding to the parabolic shape of the solar collector panel. Spaced apart rollers are positioned along an upper surface of each support frame to support the solar collector panel. A drive mechanism is coupled to the solar collector panel for rotation thereof. The solar collector panel includes a pair of spaced apart guide channels on an underside thereof for contacting the spaced apart rollers to ensure that the solar collector panel rotates squarely with respect to the base.

26 Claims, 4 Drawing Sheets

(56) References Cited

U.S. PATENT DOCUMENTS

| | | | |
|---|---|---|---|
| 4,107,521 A | 8/1978 | Winders | 250/203 |
| 4,111,184 A * | 9/1978 | Fletcher et al. | 126/577 |
| 4,115,177 A * | 9/1978 | Nelson | 156/245 |
| 4,119,365 A * | 10/1978 | Powell | 359/848 |
| 4,135,493 A | 1/1979 | Kennedy | 126/271 |
| 4,136,671 A * | 1/1979 | Whiteford | 126/654 |
| 4,174,704 A * | 11/1979 | Nelson | 126/696 |
| 4,268,332 A * | 5/1981 | Winders | 156/160 |
| 4,324,947 A * | 4/1982 | Dumbeck | 136/248 |
| 4,365,616 A * | 12/1982 | Vandenberg | 126/581 |
| 4,372,027 A | 2/1983 | Hutchison | 29/448 |
| 4,423,719 A | 1/1984 | Hutchison | 126/738 |
| 4,546,757 A * | 10/1985 | Jakahi | 126/604 |
| 4,555,585 A | 11/1985 | Behrens et al. | 136/245 |
| 5,069,540 A | 12/1991 | Gonder | 350/631 |
| 6,131,565 A | 10/2000 | Mills | 126/577 |
| 6,363,928 B1 * | 4/2002 | Anderson, Jr. | 126/577 |
| 6,543,441 B2 * | 4/2003 | Funger et al. | 126/606 |
| 6,892,724 B1 | 5/2005 | Niedermeyer | 126/694 |
| 7,055,519 B2 * | 6/2006 | Litwin | 126/683 |
| 7,296,410 B2 | 11/2007 | Litwin | 60/641.12 |
| 7,553,035 B2 * | 6/2009 | Wright | 359/851 |
| 7,878,191 B2 * | 2/2011 | Bender | 126/696 |
| 7,878,192 B2 * | 2/2011 | Larsen | 126/696 |
| 8,353,285 B2 * | 1/2013 | Litwin | 126/573 |
| 2002/0106490 A1 | 8/2002 | Wagenblast | 428/180 |
| 2003/0210483 A1 * | 11/2003 | Wright | 359/871 |
| 2008/0202499 A1 | 8/2008 | Weir et al. | 126/651 |
| 2008/0308094 A1 * | 12/2008 | Johnston | 126/694 |
| 2009/0183731 A1 * | 7/2009 | Capan | 126/605 |
| 2010/0269816 A1 * | 10/2010 | Polk, Jr. | 126/600 |
| 2011/0100355 A1 * | 5/2011 | Pedretti | 126/607 |
| 2011/0100358 A1 * | 5/2011 | Perisho | 126/690 |
| 2011/0168161 A1 * | 7/2011 | Capan | 126/578 |
| 2011/0186041 A1 * | 8/2011 | Kalina | 126/601 |
| 2011/0286121 A1 * | 11/2011 | Werner et al. | 359/872 |

* cited by examiner

PARABOLIC SOLAR ENERGY COLLECTOR APPARATUS

RELATED APPLICATIONS

This application claims the benefit of U.S. Provisional Application Ser. No. 61/138,287 filed Dec. 17, 2008, the entire contents of which are incorporated herein by reference.

FIELD OF THE INVENTION

The present invention relates to the field of solar energy collectors, and more particularly, to a parabolic solar energy collector.

BACKGROUND OF THE INVENTION

There are a variety of solar energy collectors available for converting solar energy into other forms of energy that can be more readily used or stored. These apparatuses typically employ solar collectors that collect solar radiation and convert it into a more useable form of energy, such as heat.

Solar collectors of the flat plate type have been used in low energy applications such as heating water, generating low pressure steam, supplementing air conditioning and heating systems, and the like. Flat plate collectors do not focus the sun's radiation and have limited applicability.

Another type of collector is generically called a concentrating collector. These collectors focus or concentrate the sun's radiation energy in a particular area. Concentrating collectors can be designed to operate at high temperatures with reasonable flow rates, thus substantially increasing the versatility over apparatuses employing flat plate collectors.

One type of concentrating collector is the parabolic trough collector. This type of collector uses an elongated reflective trough having a parabolic cross-section to concentrate the sun's radiation along a focal line extending through the focal points of the parabolic elements of the trough. A conduit can be positioned along this focal line and a heat transfer liquid can be circulated through the conduit, where it will be heated by the sun's energy. Satisfactory flow rates at high temperatures can be obtained from these collectors. With the assistance of a tracking system, parabolic trough collectors can become very efficient as they follow the movement of the sun.

Parabolic type collectors are efficient and versatile for generating energy from solar radiation. As solar energy collector apparatuses incorporating parabolic type collectors are used to satisfy larger energy requirements, they become physically larger. In some apparatuses, the aggregate collector surface may typically approach thousands of square meters. Consequently, there is a need for light-weight parabolic type collectors so that they are easier to transport and assemble.

U.S. Pat. No. 4,234,719 discloses a parabolic trough solar energy collector that is fabricated without the need for any blind fasteners or blind fastening devices. A integrated parabolic solar energy collector is provided which can be welded or fastened with spot welds, seam welds, rivets, bolts or the like.

U.S. Pat. No. 4,135,493 discloses a parabolic trough solar energy collector including an elongated support with a plurality of ribs secured thereto and extending outwardly therefrom. One surface of the ribs is shaped to define a parabola and is adapted to receive and support a thin reflecting sheet which forms a parabolic trough reflecting surface. One or more of the collectors is adapted to be joined end to end and supported for joint rotation to track the sun.

Even in view of the advances made in parabolic trough solar energy collectors, there is still a need to simplify their construction so that they are easier to transport and assemble.

SUMMARY OF THE INVENTION

In view of the foregoing background, it is therefore an object of the present invention to provide a solar energy collector apparatus that is relatively straightforward to transport and assemble.

This and other objects, advantages and features in accordance with the present invention are provided by a solar energy collector apparatus comprising a solar collector panel having a parabolic shape, and a base comprising a pair of spaced apart support frames. Each support frame has a parabolic shape corresponding to the parabolic shape of the solar collector panel. Spaced apart rollers may be positioned along an upper surface of each support frame to support the solar collector panel. A drive mechanism may be coupled to the solar collector panel for rotation thereof. The solar collector panel may include a pair of spaced apart guide channels on an underside thereof for contacting the spaced apart rollers to ensure that the solar collector panel rotates squarely with respect to the base.

In accordance with the present invention, the solar energy collector apparatus is relatively straightforward to transport and assemble. These advantages are provided without sacrificing the rigidity or structural integrity of the solar energy collector apparatus incorporating a solar collector panel having a parabolic shape.

Each support frame may comprise a center section, and spaced apart forward and rear upper sections rotatably coupled to the center section. The forward upper section of each support frame may be rotatable between an up position and a down position so as to not block sunlight based on position of the solar collector panel. Likewise, the rear upper section of each support frame may be rotatable between an up position and a down position so as to not block sunlight based on position of the solar collector panel. Rotation of the forward and rear upper sections between the up and down positions based on the position of the solar collect panel advantageously prevents sun blockage thereon.

The solar energy collector apparatus may further comprise at least one forward rotation assembly coupled to the forward upper sections of the support frames for rotating between the up and down positions, and at least one rear rotation assembly coupled to the rear upper sections of the support frames for rotating between the up and down positions. The at least one forward and rear rotation assemblies each may comprise at least one actuator. The solar energy collector apparatus may further comprise at least one position sensor for determining the position of the solar collector panel so that the at least one forward and rear rotation assemblies operate in response to the at least one position sensor.

The spaced apart support frames may be symmetrical. Each support frame may comprise a ribbed inner surface and a ribbed outer surface. The ribbed inner and outer surfaces may be symmetrical to one another. Each support frame may be formed as a monolithic unit. Each support frame may comprise at least one of a thermoplastic material and a thermosetting material. These features advantageously allow the solar energy collector apparatus to be light-weight without sacrificing rigidity or structural integrity. These features also help to reduce costs.

The solar energy collector apparatus may further comprise a sun sensor for tracking position of the sun. The drive mechanism may rotate the solar collector panel based on the position of the sun as determined by the sun sensor.

The solar collector panel may comprise a parabolic trough solar collector panel. The solar collector panel may comprise a reflective surface comprising at least one of a reflective film and a reflective coating. The solar collector panel may comprise first and second panel sections joined together and forming a seam therebetween, and a pair of spaced apart cables may be coupled to opposing ends of the first and second panel sections opposite the seam to adjust a shape of the solar collector panel.

The solar energy collector apparatus may further comprise a plurality of pylons adjacent the base, and a conduit carried by the plurality of pylons and positioned along a focal line of the solar collector panel. The conduit may be for circulating a fluid therethrough to be heated by sunlight reflecting off of the solar collector panel.

Another aspect of the invention is directed to a solar energy collector apparatus comprising a solar collector panel having a parabolic shape, and a base comprising a pair of spaced apart support frames, with each support frame having a parabolic shape corresponding to the parabolic shape of the solar collector panel. Each support frame may comprise a center section, and spaced apart forward and rear upper sections rotatably coupled to the center section. A drive mechanism may be coupled to the solar collector panel for rotation thereof. At least one position sensor may be used for determining position of the solar collector panel. The forward and rear upper sections of each support frame may be rotatable between an up position and a down position so as to not block sunlight in response to the at least one position sensor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
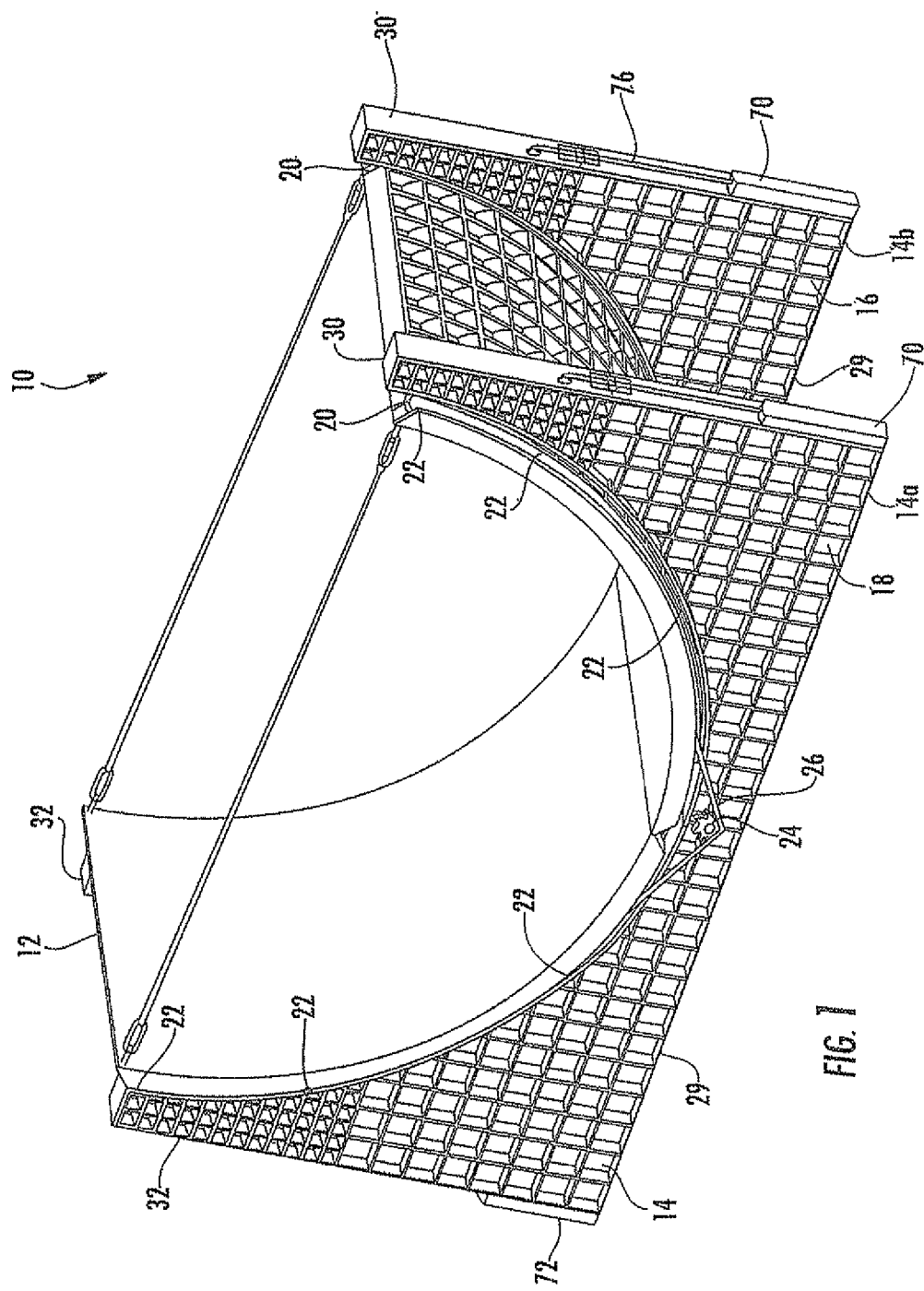
FIG. 1 is a perspective view of a solar energy collector apparatus in accordance with the present invention.

Referring initially to FIG. 1, a solar energy collector apparatus 10 comprises a solar collector panel 12 carried by a base 14. The solar collector panel 12 has a parabolic shape. The base 14 includes a pair of spaced apart support frames 14a, 14b. The support frames 14a, 14b are symmetrical to one another. In addition, each support frame 14a, 14b may be symmetrical to itself.

Each support frame 14a, 14b has an inner surface 16 and an outer surface 18. To avoid warping, both the inner and outer surfaces 16, 18 may be ribbed. The ribbing may also be symmetrical between the inner and outer surfaces 16, 18. Although not illustrated, at least one cross member extends between the inner surfaces 16 of the support frames 14a, 14b so that they remain in a fixed spaced apart position.

The solar energy collector apparatus 10 is relatively straightforward to transport and assemble. These advantages are provided without sacrificing the rigidity or structural integrity of the solar energy collector apparatus 10 incorporating a solar collector panel 12 having a parabolic shape.

The solar collector panel 12 includes a pair of molded channels 20 along outer edges thereof. Rollers 22 are positioned along an upper surface of each support frame 14a, 14b. The channels 20 rest on the rollers 22. The channels 20 and rollers 22 are used to ensure that the parabolic trough solar collector panel 12 rotates squarely with respect to the base 14. Alternatively, bearings or a similar type arrangement that reduces friction between two surfaces may be used in lieu of the rollers 22, as readily appreciated by those skilled in the art.

Rotation of the illustrated solar collector panel 12 is chain driven. A motor is used to turn a gear 24 that then moves a chain 26 coupled to the solar collector panel 12. Alternatively, the solar collector panel 12 may be belt driven, for example. The same drive mechanism may be configured on the other side of the solar collector panel 12. In other words, rotation of the solar collector panel 12 may be initiated by a pair of gears 24 and chains 26.

Figure 2:
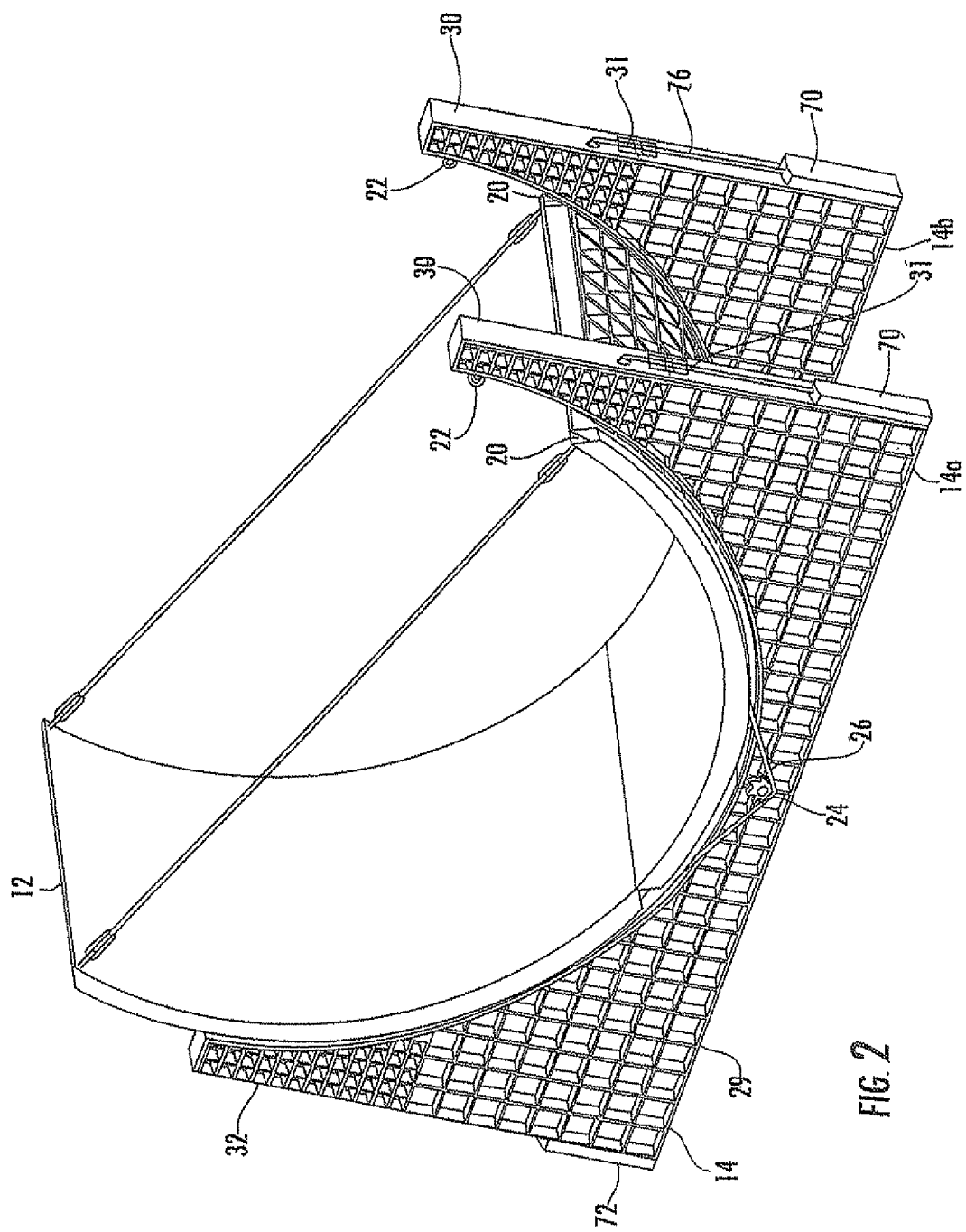
FIG. 2 is a perspective view of the solar energy collector apparatus shown in FIG. 1 with the solar collector panel rotated.
Figure 3:
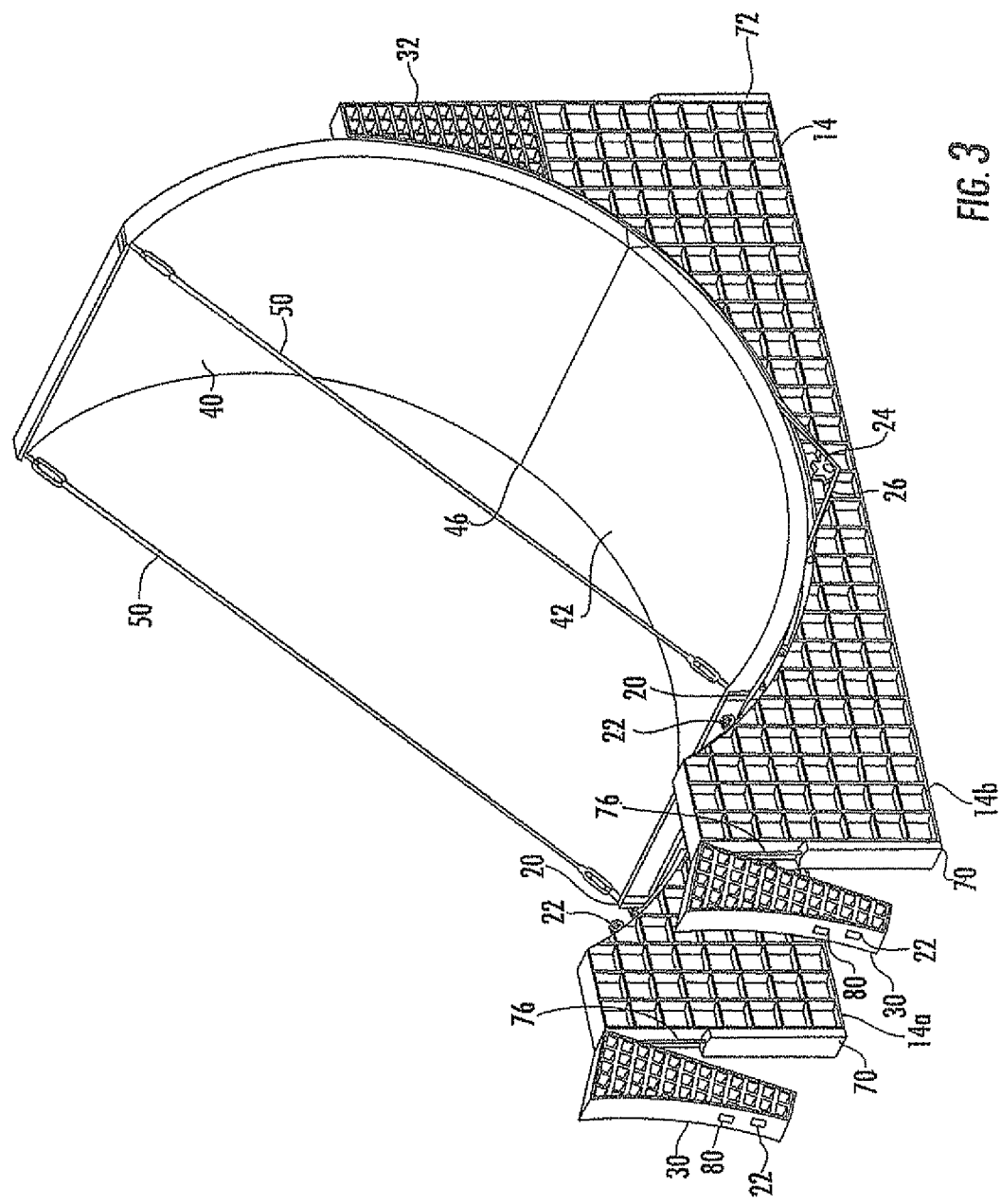
FIG. 3 is a perspective view of the solar energy collector apparatus shown in FIG. 2 with the forward upper section of each support frame rotated in a down position so as not to block sunlight on the solar collector panel.

Each support frame 14a, 14b comprises a center section 29, and spaced apart forward and rear upper sections 30, 32 rotatably coupled to the center section. As the solar collector panel 12 is rotated to track position of the sun, the forward upper sections 30 of the support frames 14a, 14b block a portion of the sunlight on the reflective surface of the solar collector panel 12, as illustrated in FIG. 2. This causes a shadow to be cast on the reflective surface, which reduces the efficiency of the solar collector panel 12. To remove or reduce the shadow cast by the forward upper sections 30 of the support frames 14a, 14b, they are rotated about a hinge or pivot point 31.

The rotation is provided by forward rotation assemblies 70 coupled to the forward upper sections 30 of the support frames 14a, 14b for rotating between the up and down positions. Likewise, rear rotation assemblies 72 are coupled to the rear upper sections 32 of the support frames 14a, 14b for rotating between the up and down positions. Each forward and rear rotation assembly 70, 72 comprises an actuator 76 for moving the forward and rear upper sections 30, 32 between the up and down positions. The actuator 76 may be electrically operated or hydraulically operated, for example.

In the illustrated example, a separate rotation assembly 70, 72 is provided for each upper section 30, 32 that is to be rotated. Also in the illustrated example, each rotation assembly 70, 72 is mounted on an outer edge of the center sections 29 of the support frames 14a, 14b.

At least one position sensor 80 may be used for determining the position of the solar collector panel 12. The forward and rear rotation assemblies 70, 72 operate in response to the at least one position sensor 80. The output of the position sensor 80 may be wired directly to the forward and rear rotation assemblies 70, 72. Alternatively, the output of the position sensor 80 may be wired directly to a controller, which in turn is wired to the forward and rear rotation assemblies 70, 72. In addition, the interface between the position sensor 80 and the forward and rear rotation assemblies 70, 72 may be wireless.

When the solar collector panel 12 is rotated the same amount in the other direction to track the sun, then the rear upper portions 32 of the base 14 also block a portion of the sun on the reflective surface of the solar collector panel 12. Again, this causes a shadow to be cast on the reflective surface, which reduces the efficiency of the solar collector panel 12. To remove or reduce the shadow cast by the rear upper portions 32 of the base 14, they are also rotated about a hinge point. The rear rotation assemblies 72 operate in response to the at least one position sensor 80. Alternatively, additional position sensors may be used to operate the rear rotation assemblies 72.

The solar collector panel 12 has a reflective surface. A reflective film or coating is on the reflective surface. The use of mirrors is avoided, which would significantly add to the weight of the parabolic trough solar collector panel 12.

For shipping purposes, the solar collector panel 12 is made in sections 40, 42. For example, sections 40 and 42 are joined together with a seam 46 being formed therebetween. To strengthen each section 40 and 42, they are formed with ribs, as best shown in FIG. 1. The ribs are formed in-situ, and add strength and stability to the sections 40, 42. A pair of spaced apart cables 50 is used to adjust positioning of the sections 40, 42 so that an ideal parabola may be formed for maximizing focus of the received light onto a focal point.

In addition to the solar collector panel 12 following rotation of the sun, the solar collector 10 itself may be rotated to track seasonal rotation of the sun. This rotation may be limited to within plus/minus 10 degrees, for example. This advantageously maximizes collection of the solar energy from the sun by the solar collector panel 12. The solar collector 10 may rest on a platform that allows for the rotation in response to a controller. Alternatively, the solar collector panel 12 may be rotated while the base 14 remains stationary.

Figure 4:
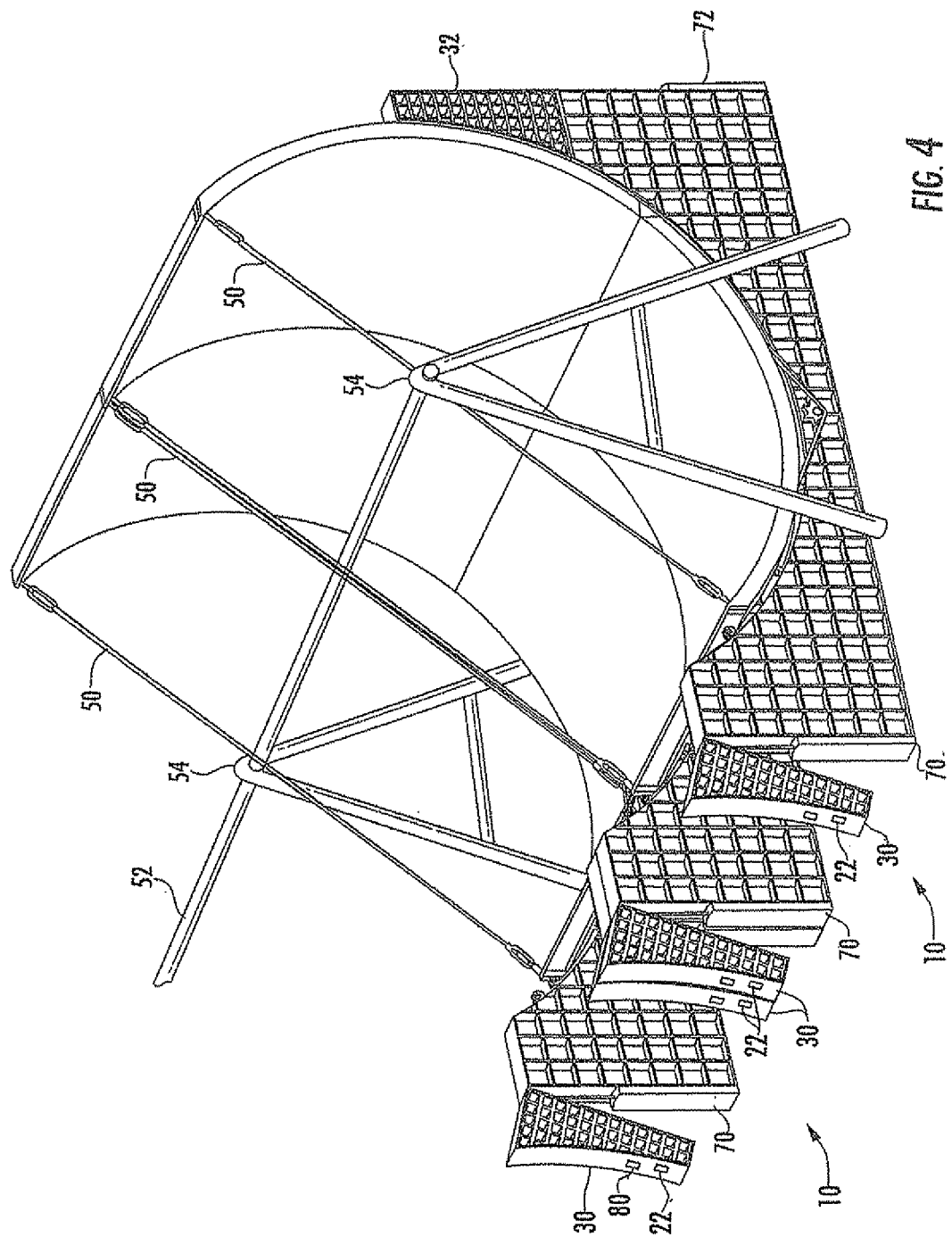
FIG. 4 is a perspective view of a solar energy collector apparatus including a conduit circulating a fluid therethrough to be heated by sunlight reflecting off of the solar collector panel in accordance with the present invention.

To achieve collection areas required for some applications, a plurality of solar collector panels 12 may be positioned side-by-side. As illustrated in FIG. 4, two solar collector panels 12 are positioned side-by-side. The two solar collector panels 12 are for illustration purposes, and more are typically positioned side-by-side. The actual number of solar collector panels 12 may depend on the intended application.

A conduit 52 is positioned along a focal line of the solar collector panels 12 so as to heat a circulating fluid passing therethrough. Pylons 54 are used to support the conduit 52. The dimensions of a solar energy collector system 10 may be 8 feet wide, 15 feet deep, and 20 feet tall. Of course, the solar energy collector system 10 may be formed in other dimensions depending on the intended application.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed is:

1. A solar energy collector apparatus comprising:
   a solar collector panel having a parabolic shape with forward and rear upper edges;
   a base comprising a pair of spaced apart support frames, each support frame having a parabolic shape corresponding to the parabolic shape of said solar collector panel, with each support frame comprising
   a center section having a forward outer edge and a rear outer edge,
   spaced apart forward and rear upper sections coupled to the forward and rear outer edges of said center section and extending in height above said center section,
   a forward interface between the forward outer edge of said center section and said forward upper section, and a rear interface between the rear outer edge of said center section and said rear upper section are both below the forward and rear upper edges of said solar collector panel when said solar collector panel is in a non-rotated position, and
   with at least one of said forward and rear upper sections being individually rotated outwards from said center section to a rotated position so as to not block sunlight on said solar collector panel;
   a plurality of spaced apart rollers positioned along an upper surface of each support frame to support said solar collector panel;
   a drive mechanism coupled to said solar collector panel for rotation thereof; and
   said solar collector panel including a pair of spaced apart guide channels on an underside thereof for contacting said plurality of spaced apart rollers to ensure that said solar collector panel rotates squarely with respect to said base.

2. The solar energy collector apparatus according to claim 1 wherein said forward upper section of each support frame is rotatable between an up position and a down position so as to not block sunlight based on position of said solar collector panel.

3. The solar energy collector apparatus according to claim 2 wherein said rear upper section of each support frame is rotatable between an up position and a down position so as to not block sunlight based on position of said solar collector panel.

4. The solar energy collector apparatus according to claim 2 further comprising:
   at least one forward rotation assembly coupled to said forward upper sections of said support frames for rotating between the up and down positions; and
   at least one rear rotation assembly coupled to said rear upper sections of said support frames for rotating between the up and down positions.

5. The solar energy collector apparatus according to claim 4 further comprising at least one position sensor for determining the position of said solar collector panel; and wherein said at least one forward and rear rotation assemblies operate in response to said at least one position sensor.

6. The solar energy collector apparatus according to claim 4 wherein said at least one forward and rear rotation assemblies each comprises at least one actuator.

7. The solar energy collector apparatus according to claim 1 wherein said spaced apart support frames are symmetrical.

8. The solar energy collector apparatus according to claim 1 wherein each support frame comprises a ribbed inner surface and a ribbed outer surface.

9. The solar energy collector apparatus according to claim 8 wherein the ribbed inner and outer surfaces are symmetrical to one another.

10. The solar energy collector apparatus according to claim 1 wherein each support frame comprises at least one of a thermoplastic material and a thermosetting material.

11. The solar energy collector apparatus according to claim 1 further comprising a sun sensor for tracking position of the sun; and wherein said drive mechanism rotates said solar collector panel based on the position of the sun.

12. The solar energy collector apparatus according to claim 1 wherein said solar collector panel comprises a parabolic trough solar collector panel.

13. The solar energy collector apparatus according to claim 1 wherein said solar collector panel comprises a reflective surface comprising at least one of a reflective film and a reflective coating.

14. The solar energy collector apparatus according to claim 1 wherein said solar collector panel comprises first and second panel sections joined together and forming a seam therebetween; and further comprising a pair of spaced apart cables coupled to opposing ends of said first and second panel sections opposite the seam to adjust a shape of said solar collector panel.

15. The solar energy collector apparatus according to claim 1 further comprising:
   a plurality of pylons adjacent said base; and
   a conduit carried by said plurality of pylons and positioned along a focal line of said solar collector panel, said conduit for circulating a fluid therethrough to be heated by sunlight reflecting off of said solar collector panel.

16. A solar energy collector apparatus comprising:
   a solar collector panel having a parabolic shape with forward and rear upper edges;
   a base comprising a pair of spaced apart support frames, each support frame having a parabolic shape corresponding to the parabolic shape of said solar collector panel, with each support frame comprising
      a center section having a forward outer edge and a rear outer edge,
      spaced apart forward and rear upper sections coupled to the forward and rear outer edges of said center section and extending in height above said center section,
      a forward interface between the forward outer edge of said center section and said forward upper section, and a rear interface between the rear outer edge of said center section and said rear upper section are both below the forward and rear upper edges of said solar collector panel when said solar collector panel is in a non-rotated position, and
      when in a non-rotated position, with at least one of said forward and rear upper sections being individually rotated outwards from said center section to a rotated position so as to not block sunlight on said solar collector panel;
   a drive mechanism coupled to said solar collector panel for rotation thereof;
   at least one position sensor for determining position of said solar collector panel; and
   said forward and rear upper sections of each support frame being rotatable between an up position and a down position so as to not block sunlight in response to said at least one position sensor.

17. The solar energy collector apparatus according to claim 16 further comprising:
   at least one forward rotation assembly coupled to said forward upper sections of said support frames for rotating between the up and down positions; and
   at least one rear rotation assembly coupled to said rear upper sections of said support frames for rotating between the up and down positions.

18. The solar energy collector apparatus according to claim 17 wherein said at least one forward and rear rotation assemblies operate in response to said at least one position sensor.

19. The solar energy collector apparatus according to claim 17 wherein said at least one forward and rear rotation assemblies each comprises at least one actuator.

20. The solar energy collector apparatus according to claim 16 further comprising:
   a plurality of spaced apart rollers positioned along an upper surface of each support frame to support said solar collector panel; and
   said solar collector panel including a pair of spaced apart guide channels on an underside thereof for contacting said plurality of spaced apart rollers to ensure that said solar collector panel rotates squarely with respect to said base.

21. The solar energy collector apparatus according to claim 16 wherein said spaced apart support frames are symmetrical.

22. The solar energy collector apparatus according to claim 21 wherein each support frame comprises a ribbed inner surface and a ribbed outer surface, and wherein the ribbed inner and outer surfaces are symmetrical to one another.

23. The solar energy collector apparatus according to claim 16 further comprising a sun sensor for tracking position of the sun; and wherein said drive mechanism rotates said solar collector panel based on the position of the sun.

24. The solar energy collector apparatus according to claim 16 wherein said solar collector panel comprises a reflective surface comprising at least one of a reflective film and a reflective coating.

25. The solar energy collector apparatus according to claim 16 wherein said solar collector panel comprises first and second panel sections joined together and forming a seam therebetween; and further comprising a pair of spaced apart cables coupled to opposing ends of said first and second panel sections opposite the seam to adjust a shape of said solar collector panel.

26. The solar energy collector apparatus according to claim 16 further comprising:
   a plurality of pylons adjacent said base; and
   a conduit carried by said plurality of pylons and positioned along a focal line of said solar collector panel, said conduit for circulating a fluid therethrough to be heated by sunlight reflecting off of said solar collector panel.

* * * * *